United States Patent [19]

Kitajima et al.

[11] Patent Number: 5,748,233
[45] Date of Patent: May 5, 1998

[54] IMAGE SIGNAL CODING DEVICE OF ELECTRONIC STILL CAMERA

[75] Inventors: Tatsutoshi Kitajima, Kodaira; Yasushi Yamamoto, Ebina, both of Japan

[73] Assignee: Ricoh Company, Ltd., Tokyo, Japan

[21] Appl. No.: 635,875

[22] Filed: Apr. 18, 1996

[30] Foreign Application Priority Data

Apr. 18, 1995 [JP] Japan .................................. 7-092597

[51] Int. Cl.⁶ .................................................. H04N 5/225
[52] U.S. Cl. .......................... 348/220; 348/384; 548/231
[58] Field of Search ............................. 348/207, 220, 348/221, 384, 390, 231, 232, 233; 386/33, 109, 111, 112; 341/50, 51, 95, 106; 382/236, 239; 358/261.1; H04N 5/225

[56] References Cited

U.S. PATENT DOCUMENTS

| | | | |
|---|---|---|---|
| 5,467,129 | 11/1995 | Suzuki | 348/231 |
| 5,526,047 | 6/1996 | Sawanobori et al. | 348/222 |
| 5,619,265 | 4/1997 | Suzuki et al. | 348/362 |

*Primary Examiner*—Andrew Faile
*Assistant Examiner*—Tuan V. Ho
*Attorney, Agent, or Firm*—Oblon, Spivak, McClelland, Maier & Neustadt, P.C.

[57] ABSTRACT

A CPU (11) checks a photographic storing mode for a still image or animate object which is determined when photography takes place and a compression rate mode (a compression rate depends on normal, economy, and the like). When the checked mode coincides with a photographic storing mode or compression rate mode stored in an EEPROM (12) when photographs were taken, a scale factor is read which is stored in the EEPROM (12) in correspondence with the respective modes and which has been used for compressing and coding. After that, the scale factor is set in a data compression/extension section (7) and is used as a scale factor for the compression/coding in the present photography. Accordingly, the time required to determine a scale factor is shortened, and an error generated when an image signal is stored is prevented. Accordingly, a good photographic result can be obtained.

4 Claims, 5 Drawing Sheets

IMAGE SIGNAL CODING DEVICE OF ELECTRONIC STILL CAMERA

BACKGROUND OF THE INVENTION

1. Field of the Invention

The present invention relates to an image signal coding device of an electronic still camera in which a multi-value image signal obtained by photography is compressed and coded by fixed-length coding process.

2. Description of Related Art

In the past, as a system for compressing and coding a multi-value image signal, a variable-length coding system and a fixed-length coding system have been known. Of these systems, the variable-length coding system requires bit processing and therefore has a drawback in that the processing speed is slow. On the other hand, the fixed-length coding system does not require the bit processing and therefore can increase the processing speed. Such a fixed-length coding system is disclosed in Japanese Patent Application Laid-Open Publication Nos. Sho 62-100080, Hei 3-236680, Hei 4-170879, Hei 4-294685, and Hei 5-153401.

The fixed-length coding system is used not only to compress and code a multi-value image signal but also to compress digital data for storing a photographic image signal of the electronic still camera in a memory card.

In a conventional electronic still camera, since the fixed-length coding process is used to compress and code digital data so as to store a photographic image signal in a memory card, the processing speed can be somewhat increased, but disadvantages to be overcome still exist in order to handle the camera such easily. In other words, since the conventional electronic still camera is constructed to carry out the fixed-length coding whenever a photograph is taken, the same fixed-length coding must be again carried out for the next photography regardless of the same photographing conditions, such as same photographic subject, same photographing mode, and so on. For this reason, disadvantageously, such time is consumed until the next photography is ready in the case of continuous photography.

In addition, another problem resides in that the conventional electronic still camera is designed to store a compressed and coded multi-value image signal in the memory card without giving careful consideration to the quantitative magnitude of the coded signal. Accordingly, errors are liable to occur, thus bringing about bed photographic results.

SUMMARY OF THE INVENTION

An object of the present invention is to provide an image signal coding device of an electronic will camera which can perform the compressing and coding of an image signal in a short time and can prevent errors produced when the image signal is stored or recorded, so that a good photographic result can be obtained.

To achieve the object, an image signal coding device of an electronic still camera according to the present invention comprises a compressing/coding means for performing first fixed-length coding in which a multi-value image signal obtained by photography is compressed and coded by an initial scale factor, and second fixed-length coding in which a scale factor to be used is found and determined by shifting a value of the initial scale factor on a scale factor table in accordance with a code amount of the multi-value image signal coded by the first fixed-length coding and the multi-value image signal is compressed and coded by the determined scale factor; a memory means for storing at least one of an image recording mode and a compression rate mode when the photography is carried out and storing a value of a scale factor value used in correspondence with the image recording mode and/or the compression rate mode set when the photography is carried out, and a control means for, when an image recording mode or a compression rate mode set whenever photography is carried out is detected and coincides with any one of modes which has been already stored in the memory means, reading a value of a scale factor which has been already stored in the memory means and corresponds to the detected mode and setting this value of the read scale factor as the value of the initial scale factor.

The memory means comprises a non-volatile memory.

Further, to achieve the object, an image signal coding device of an electronic still camera according to the present invention comprises the above-mentioned compressing/coding means and a control means by which, if a code amount of a multi-value image signal coded by the compressing/coding means exceeds a maximum code amount regulating value beforehand set by the second fixed-length coding when a moving object is photographed, processing for reducing the code amount every one field of the coded image signal in image operation is carried out and storage of processed data in an external memory medium is inhibited until the code amount becomes less than the maximum code amount regulating value.

Further, to achieve the object, an image signal coding device of an electronic still camera according to the present invention comprises the above-mentioned compressing/coding means and a control means by which, if a code amount of a multi-value image signal coded by the compressing/coding means exceeds a maximum code amount regulating value beforehand set by the second fixed-length coding when photography is continuously carried out, code amount reducing control in which a reduction rate is higher than that is photography of a still image is carried to make the code amount less than the maximum code amount regulating value and, after that, processed data is stored in an external memory medium, or if a code amount of a multi-value image signal coded by the compressing/coding means is less than a minimum code amount regulating value beforehand set by the second fixed-length coding when photography is continuously carried out, code amount increasing control same as that in photography of a still image is carried out to store processed data in the external memory medium.

According to the present invention, a photographic recording mode and a compression rate mode (a compression rate depends on normal, economy, and so on) for a still object or animate object which are set when photography is carried out are automatically checked and, if the checked mode coincides with a photographic recording mode or a compression rate mode used in previous photography, a scale factor which has been used for the compressing/coding in the previous photography and has been stored in the memory means (non-volatile memory) in correspondence with the respective modes is used as a scale factor for the compressing/coding in the present photography. Thereby, the time required for the determination of the scale factor is shortened.

In the case of the photography of the animate object, when compressed and coded image data is stored in an external memory medium, such as a memory card, the storage is inhibited if one field of the image signal exceeds a storable code amount, or in the case of continuous photography, the number of times of fixed-length coding between photographies is reduced and, in addition, a code amount to be processed is controlled not to be excessive or deficient.

DETAILED DESCRIPTION OF THE PREFERRED EMBODIMENTS

Some embodiments of the present invention will be described hereinafter with reference to the drawings.

(First Embodiment)

Figure 1:
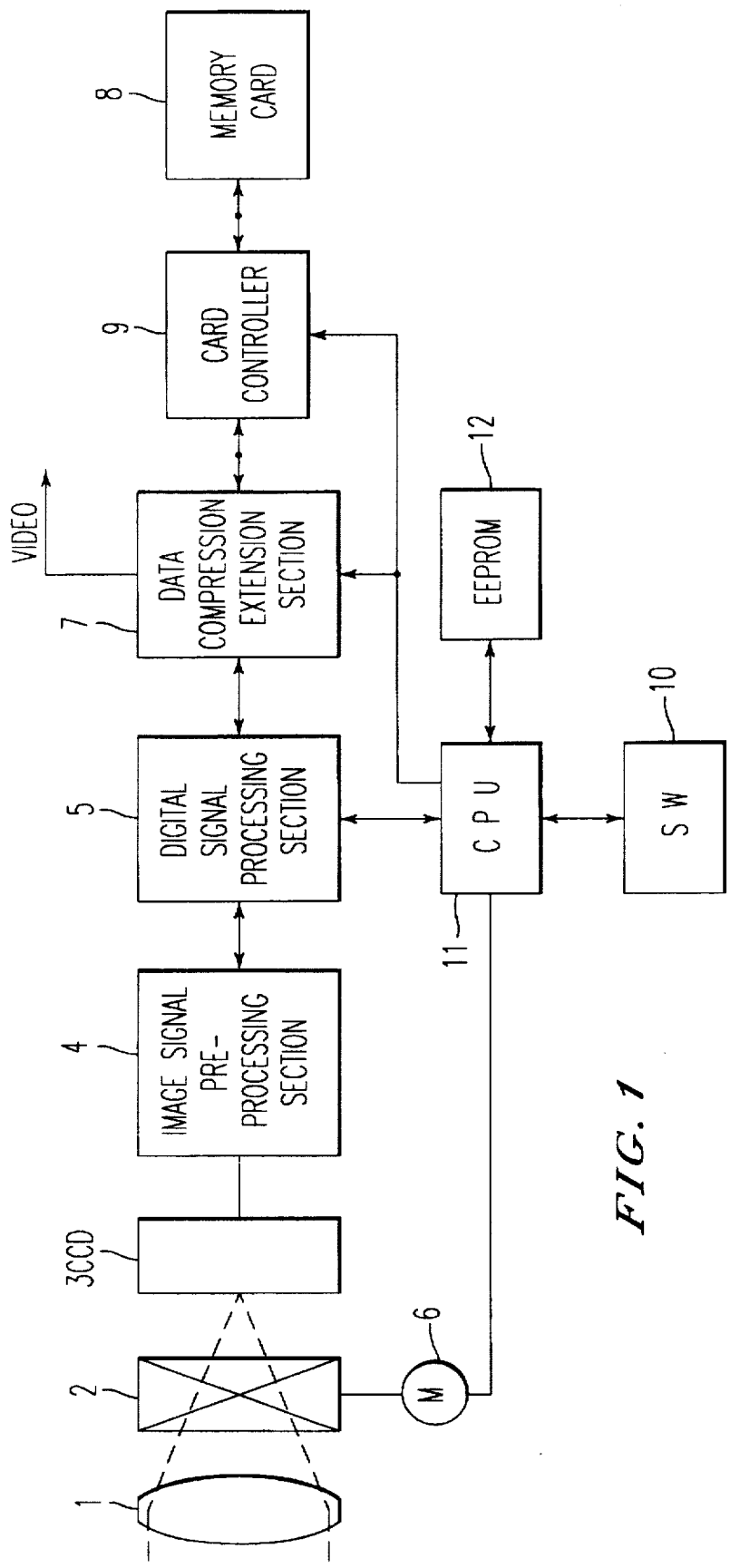
FIG. 1 is a block diagram showing the construction of an image signal coding device according to the present invention.

FIG. 1 is a block diagram showing the entire construction of the electronic still camera according to the present invention. In FIG. 1, a photographic lens 1, a blade 2 for controlling a diaphragm and a shutter, and a CCD 3 are provided substantially on the same axis. The CCD 3 is connected to an image signal pre-processing section 4. The image signal pre-processing section 4 comprises a CDS (Correlated Double Sampling Circuit) for subjecting an image signal from the CCD 3 to digital signal processing, an analog/digital conversion circuit, and so on. A digital signal processing section 5 and a data compression/extension section 7 for compressing and extending image data are connected to the image signal pre-processing section 4 and the digital signal processing section 5, respectively. A memory card 8 is connected to the data compression/extension section 7 through a card controller 9. The memory card 8 is an external storing medium for storing compressed data, and the card controller 9 is an interface for storing the compressed data in the memory card 8.

A CPU (Central Processing Unit) is further provided which controls the operation of the digital signal processing section 5, the data compression/extension section 7, and the card controller 9. To the CPU 11 are connected a motor 6 for driving the blade 2, an external switch 10, such as a first release and a second release, and an EEPROM 12 used as a non-volatile memory for storing various data.

According to this construction, the CCD 3 receives an image of an object to be photographed which is formed by the photographic lens 1 through the blade 2. The image is photoelectrically converted to output an image signal. The resultant image signal is subjected to the digital signal processing by the image signal preprocessing section 4 and the digital signal processing section 5. The image signal is then output to the data compression/extension section 7. The image data which has been subjected to the data compression processing by the data compression/extension section 7 is stored in the memory card 8 through the card controller 9.

On the other hand, in a regeneration step, image data to be regenerated which is stored in the card memory 8 is read and is subjected to the data extension processing by the data compression/extension section 7. The digital data output by the data compression/extension section 7 is converted into analog data and is output as a regenerated image signal.

Figure 2:
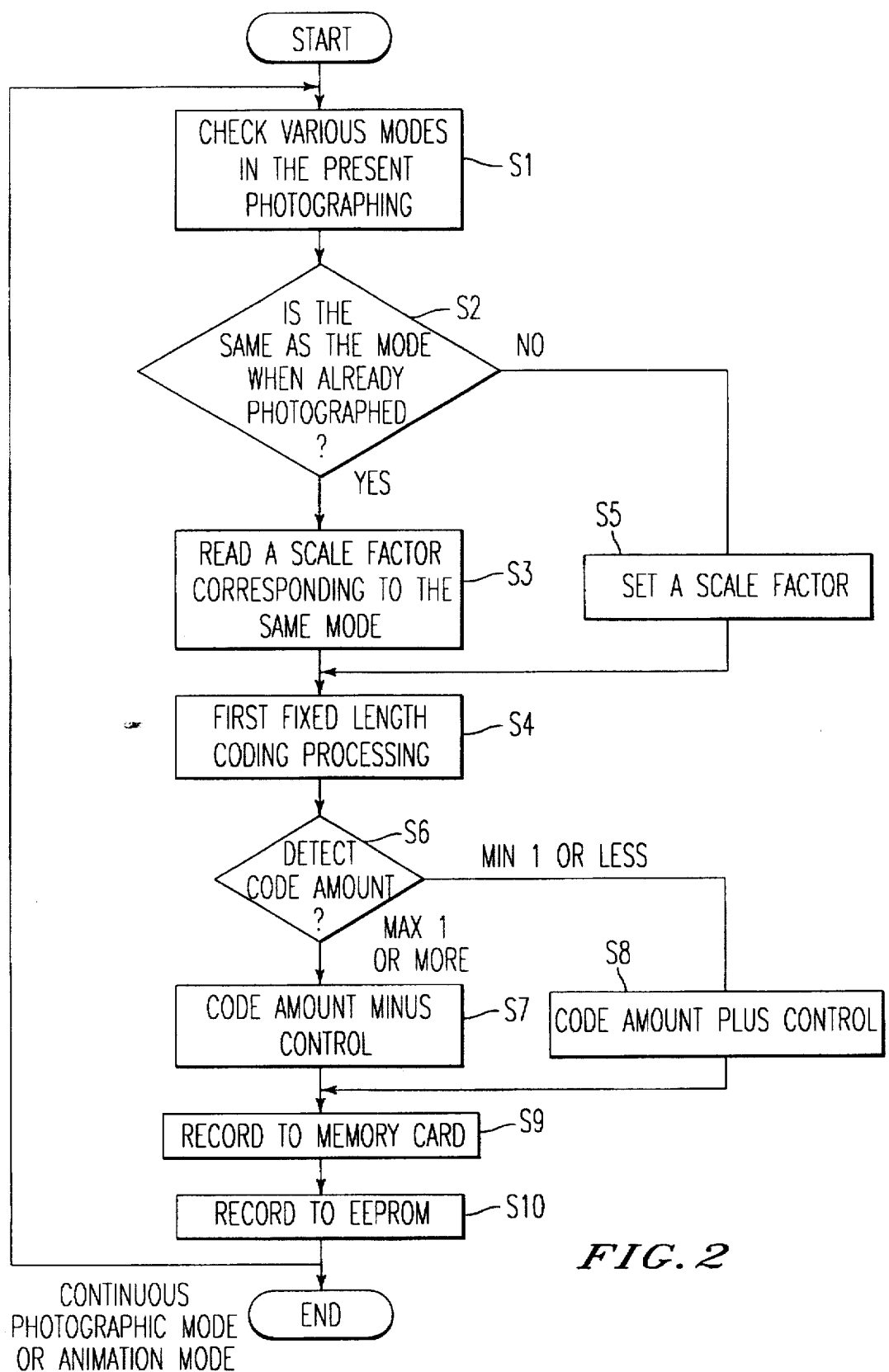
FIG. 2 is a flowchart for explaining the operation of the image signal coding device of FIG. 1, the operation being conducted when photographing.

FIG. 2 is a flowchart showing the operation of the camera conducted when photography takes place in this embodiment. First, the external switch 10 is turned on to start the photography, and then an image pickup operation is taken. The CPU 11 examines whether the present mode set by a photographer is a photographic recording mode or a compression rate mode (S1), and determines whether or not the same mode as the present mode exists in mode information stored in the EEPROM 12 (S2). If the same mode exists (in S2, YES), a scale factor value for the first fixed-length coding of the data compression/extension section 7 is read which is stored in the EEPROM 12 in correspondence with the mode (S3). The read scale factor is used as an initial scale factor, and the first fixed-length coding is carried out based on the ratio between a code amount compressed by the initial scale factor and a target code amount (S4). On the other hand, if the same mode does not exist (in S2, NO), a new scale factor is set (S5), and the first fixed-length coding is carried out on the basis of the ratio between a code amount compressed by the new scale factor and the target code amount (S4).

Next, based on the result of the first fixed-length coding, the magnitude of the code amount is detected (S6), and the second fixed-length coding is carried out. In the second fixed-length coding, the maximum code amount regulating value (MAX 1) and the minimum code amount regulating value (MIN 1) are beforehand set. When the code amount exceeds MAX 1, a scale factor is fixed as that the minus control of the code amount can be carried out by the shift on a scale factor table (S7). When the code amount is less than MIN 1, a scale factor is fixed so that the plus control of the code amount can be carried out by the shift on the scale factor table (S8).

The thus compressed and coded data is stored in the memory card 8 through the card controller 9 in a given format (S9). The data about the scale factor determined as above is stored in the EEPROM 12 in correspondence with the data about the respective modes set when the present photography takes place (S10).

(Second Embodiment)

The electronic still camera shown in FIG. 1 can also photograph a moving object. A buffer memory (not shown in FIG. 1) contained in the card control 9 can temporarily store image data compressed by the data compression/extension section 7. The image data stored in the buffer memory is sequentially stored in the memory card 8. This will be described with reference to FIG. 3.

Figure 3:
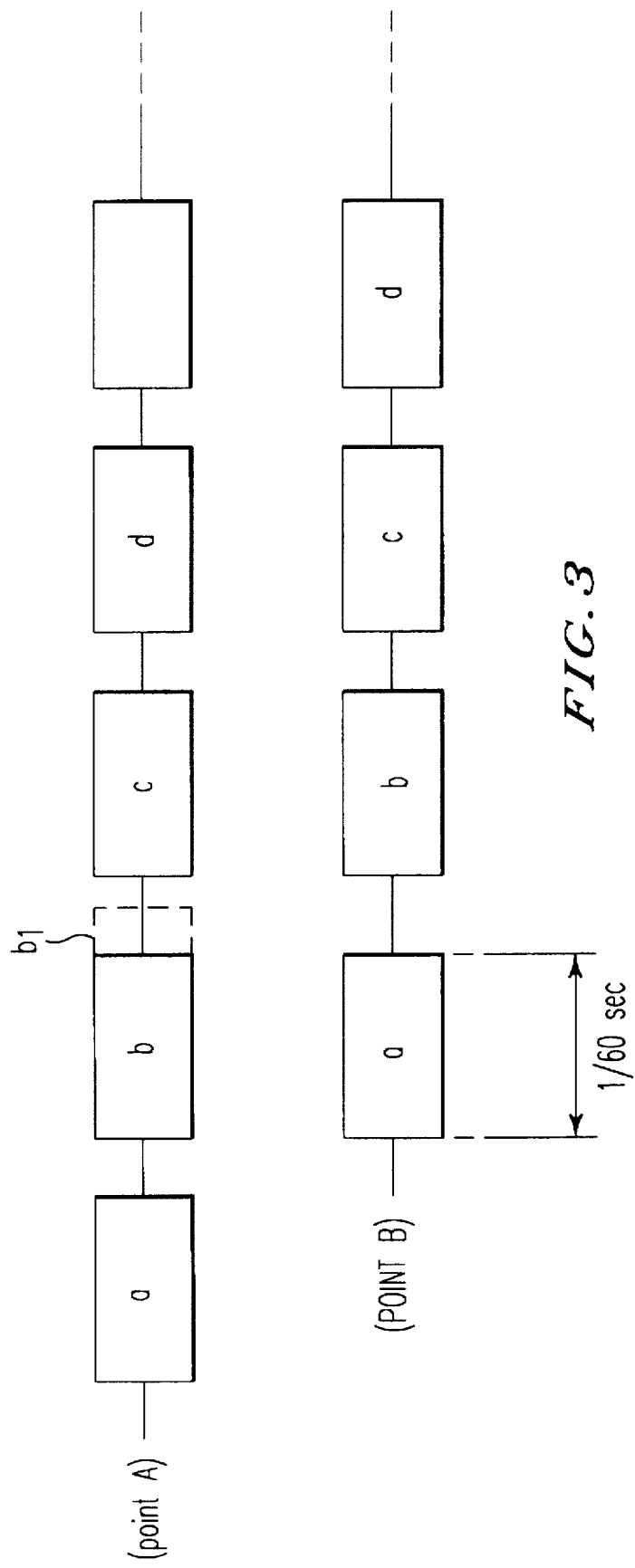
FIG. 3 is a view for explaining a timing lag of an image signal in a card controller.

FIG. 3 shows a data construction at point A and point B (see FIG. 1) in the case where compressed image data is stored in the memory card 8. At point A, the image data is divided into fields of a, b, c, d, . . . and transferred to the memory card 8. In this embodiment, two fields constitute one frame. For example, fields a and b or fields c and d constitute one frame. Generally, image data of one field is transferred in 1/60 sec.

Since the buffer memory is, as mentioned above, contained in the card controller 9, at point B, data output by the card controller 9 is in a state in which a timing lag by one field exists with respect to that at point A. If the code amount of field b is over a standard (in FIG. 3, an excess b1 is indicated by the broken line), the data cannot be normally stored in the memory card 8 and, as a result, a storage error is generated.

In view of the above, in this embodiment, for the storage of data in the memory card 8, a code amount regulating value MAX 2 is set which is larger than MAX 1 (MAX 2>MAX 1). When the code amount is less than MAX 2, the code amount is examined every one field at the time of interface scanning, in other words, whenever a VD (vertical drive signal), for example, is generated twice. After than, control is continued not to store the data in the memory card 8 until the code amount becomes less than MAX 2 while performing the code amount minus processing. Since the storing operation is inhibited when the code amount of each field exceeds a storable amount, a storage error is prevented. In FIG. 3, since field b and field c constitute one frame, if the code amount of field b is excessive, not only field b but also field c is not recorded in the memory card 8.

Figure 4:
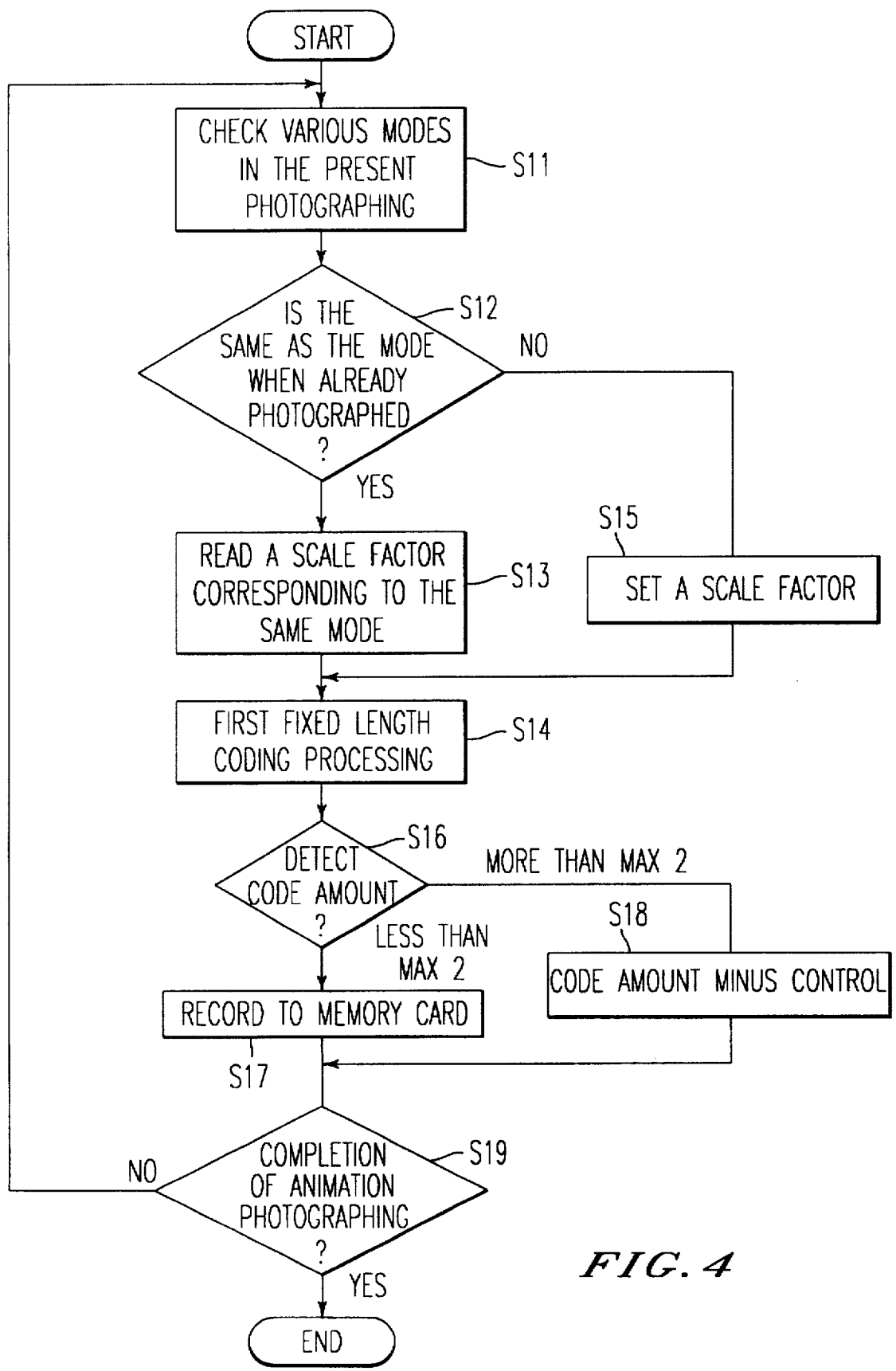
FIG. 4 is a flowchart for explaining the operation of the image signal coding device according to the present invention, the operation being conducted when photographing a moving object.

FIG. 4 is a flowchart showing the operation of the camera which is conducted when photographing in this embodiment. The steps S11 to S15 in the second embodiment are the same as the steps S1 to S5 in the first embodiment. In the second embodiment, the code amount of results obtained subsequently to the step S14 is detected (S16), and the second fixed-length coding is carried out. In the second fixed-length coding, if the code amount is less than MAX 2, data is stored in the memory card 8 (S17). If the code amount exceeds MAX 2, the storing of the data in the memory card 8 is not carried out and, instead, the code amount minus control is carried out (S18). The above operations are continued until the photography of the moving object is completed (S19).

(Third Embodiment)

The processing in continuous photography will now be described. In the second fixed-length coding in the continuous photography, the code amount minus control is carried out such that, if the code amount exceeds MAX 1, the amount of shift on the scale factor table is increased to be more than usual (i.e., than the amount of shift in photography of a still image) so that the code amount is made less than MAX 1 to store the data in the the memory card 8. When the data amount is less than MIN 1, the normal code amount plus control is carried out to store the data in the memory card 8. This brings about a solution to the disadvantageous fact that the normal fixed-length coding in the continuous photography results in a reduction of a photographing speed and, in addition, the reduction of the number of times of the coding causes deterioration in image quality.

Figure 5:
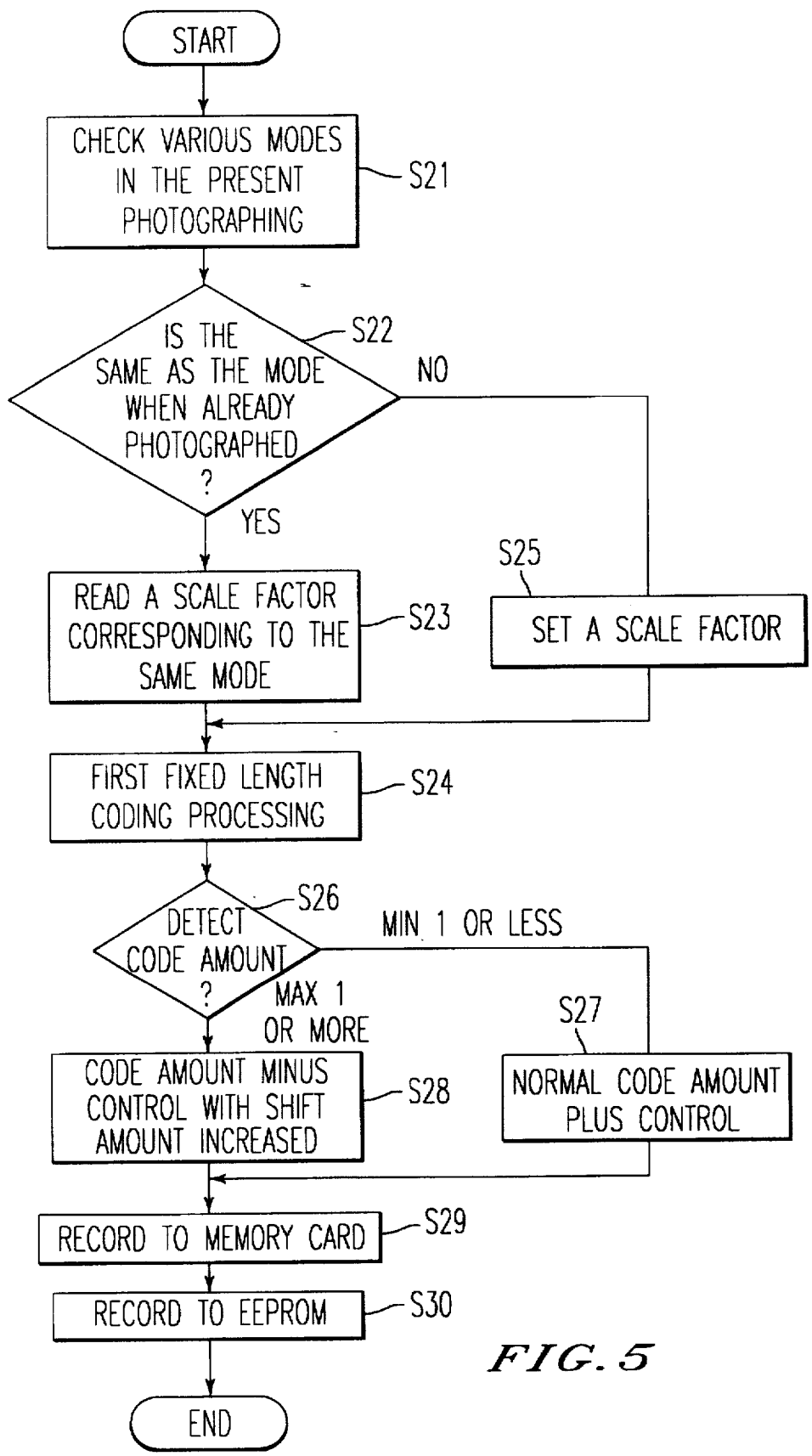
FIG. 5 is a flowchart for explaining the operation of the image signal coding device according to the present invention, the operation being conducted when performing a continuous photography.

FIG. 5 is a flowchart showing the operation in the continuous photography in the third embodiment. The steps S21 to S25 are the same as the steps S1 to S5 in the first embodiment. In the third embodiment, the code amount of results obtained subsequently to the step S24 is detected (S26), and the second fixed-length coding is carried out. In the second fixed-length coding, the normal code amount plus control is carried out if the code amount is less than MIN 1 (S2V), and the code amount minus control is carried out by increasing the amount of shift if the code amount exceeds MAX 1 (S28).

The data compressed and coded as above is stored in the memory card 8 through the card controller 9 (S29), and in the EEPROM 12 is stored the data about the scale factor determined as above in correspondence with the data about the respective modes which are set in the present photography (S30).

As described above, according to the present invention, since the time required for compressing and coding an image signal is shortened is respective photographies carried out under the same conditions, the time during which photography is carried out once is shortened.

Further, according to the present invention, since stored contents are held, the compressing and coding of a image signal is carried out without trouble in spite of the turn-off of a power supply.

Further, according to the present invention, since the storage of data in a memory medium is inhibited if the code amount of each field exceeds a storable level when photographing a moving object, a storage error is not produced.

Further, according to the present invention, in continuous photography, since the number of times of the fixed-length coding between the present photography and the subsequent photography is reduced and, in addition, the code amount is prevented from being excessive or deficient, deterioration in image quality is prevented without reducing a photographing speed in the continuous photography.

What is claimed is:

1. An image signal coding device of an electronic still camera, comprising:

compressing/coding means for performing:
first fixed-length coding wherein a multi-value image signal obtained by photography is compressed and coded by an initial scale factor, and
second fixed-length coding wherein a scale factor to be used is found and determined by shifting a value of said initial scale factor on a scale factor table in accordance with a code amount of said multi-value image signal coded by said first fixed-length coding and said multi-value image signal is compressed and coded by said determined scale factor;

memory means for storing at least one of as image recording mode and a compression rate mode when the photography is carried out and storing a value of a scale factor used in correspondence with said image recording mode and/or said compression rate mode set when the photography is carried out; and control means for, when an image recording mode or a compression rate mode set whenever photography is carried out is detected and coincides with any one of modes which has been already stored in said memory means, reading the value of a scale factor which has been already stored in said memory means and corresponds to the detected mode and setting this value of the read scale factor as the value of said initial scale factor.

2. The image signal coding device of claim 1, wherein said memory means comprises a non-volatile memory.

3. An image signal coding device of an electronic still camera, comprising:

compressing/coding means for performing:
first fixed-length coding wherein a multi-value image signal obtained by photography is compressed and coded by an initial scale factor, and
second fixed-length coding wherein a scale factor to be used is found and determined by shifting a value of said initial scale factor on a scale factor table in accordance with a code amount of said multi-value image signal coded by said first fixed-length coding and said multi-value image signal is compressed and coded by said determined scale factor;

control means by which, if a code amount of a multi-value image signal coded by said compressing/coding means exceeds a maximum code amount regulating value beforehand set by said second fixed-length coding when a moving object is photographed, processing for reducing said code amount every one field of said coded image signal in image operation is carried out and storage of processed data in an external memory medium is inhibited until said code amount becomes less than said maximum code amount regulating value.

4. An image signal coding device of an electronic still camera, comprising:

compressing/coding means for performing;

first fixed-length coding wherein a multi-value image signal obtained by photography is compressed and coded by an initial scale factor, and second fixed-length coding wherein a scale factor to be used is found and determined by shifting a value of said initial scale factor on a scale factor table in accordance with a code amount of said multi-value image signal coded by said first fixed-length coding and said multi-value image signal is compressed and coded by said determined scale factor:

control means by which, if a code amount of a multi-value image signal coded by said compressing/coding means exceeds a maximum code amount regulating value beforehand set by said second fixed-length coding when photography is continuously carried out, code amount reducing control in which a reduction rate is higher than that in photography of a still image is carried to make said code amount less than said maximum code amount regulating value and after that, processed data is stored in an external memory medium, or if a code amount of a multi-value image signal coded by said compressing/coding means is less than a minimum code amount regulating value beforehand set by said second fixed-length coding when photography is continuously carried out, code amount increasing control same as that in photography of a still image is carried out to store processed data in said external memory medium.

* * * * *